United States Patent
Leveque (10) Patent No.: US 6,712,495 B2
(45) Date of Patent: Mar. 30, 2004

(54) MIXING APPARATUS

(75) Inventor: Alain Leveque, Choisy (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/288,763

(22) Filed: Nov. 6, 2002

(65) Prior Publication Data

US 2003/0128623 A1 Jul. 10, 2003

Related U.S. Application Data

(60) Provisional application No. 60/331,817, filed on Nov. 20, 2001.

(51) Int. Cl.⁷ .............................................. B29B 7/42
(52) U.S. Cl. ................................................... 366/81
(58) Field of Search ........................ 366/79, 81–85, 366/88–90, 319, 322, 323, 324; 425/204, 208, 209; 198/676

(56) References Cited

U.S. PATENT DOCUMENTS

| | | | | |
|---|---|---|---|---|
| 2,607,077 A | * | 8/1952 | Dulmage | 366/82 |
| 3,486,192 A | * | 12/1969 | Le Roy | 366/82 |
| 3,555,616 A | * | 1/1971 | Parks | 425/209 |
| 3,564,651 A | * | 2/1971 | Covington, Jr. et al. | 366/343 |
| 3,730,492 A | * | 5/1973 | Maddock | 366/82 |
| 3,756,574 A | * | 9/1973 | Maddock | 366/82 |
| 3,762,692 A | * | 10/1973 | Schippers | 366/89 |
| 3,771,774 A | * | 11/1973 | Hook | 366/81 |
| 3,788,612 A | * | 1/1974 | Dray | 366/81 |
| 3,870,284 A | | 3/1975 | Kruder | |
| 3,942,774 A | * | 3/1976 | Sokolow | 366/77 |
| 3,957,256 A | * | 5/1976 | Murakami | 366/81 |
| 4,052,038 A | * | 10/1977 | Brand | 366/90 |
| 4,134,688 A | * | 1/1979 | Horie et al. | 366/81 |
| 4,169,679 A | * | 10/1979 | Miller et al. | 366/81 |
| 4,218,146 A | * | 8/1980 | Ingen Housz | 366/89 |
| 4,302,409 A | * | 11/1981 | Miller et al. | 425/113 |
| 4,321,229 A | * | 3/1982 | Blakeslee et al. | 366/90 |
| 4,350,657 A | * | 9/1982 | Jones et al. | 366/89 |
| 4,388,262 A | * | 6/1983 | Brasz et al. | 366/81 |

(List continued on next page.)

FOREIGN PATENT DOCUMENTS

| | | |
|---|---|---|
| GB | 1226374 | 3/1971 |
| JP | 53-81567 | * 7/1978 |
| JP | 56-5748 | * 1/1981 |
| JP | 57-34936 A | 2/1982 |
| WO | WO 99/56937 | 11/1999 |
| WO | WO 00/44548 | 8/2000 |

Primary Examiner—Charles E. Cooley (57) ABSTRACT

An apparatus for mixing thermoplastic materials is provided. The apparatus includes a barrel and a screw rotatably mounted in the barrel. The screw has a screw shaft with a thread spirally extending around the screw shaft so as to form a plurality of flights, and the screw has a zone through which melted polymer conveyed. The screw has a portion that is without a screw thread where the screw shaft forms a mixing element with a drum-shaped surface extending above the screw shaft that is coaxial with the screw shaft. This drum-shaped surface has a plurality of alternating input grooves output grooves extending in a generally axial direction. Lands extend between the input grooves and output grooves so as to separate the input grooves from the output grooves, with the length of each land being substantially equal to the length of the contiguous portion of the adjacent input and output grooves. There is a land cross-sectional shear area corresponding to each land that is equal to the length of the land multiplied by the clearance between the land and the inside surface of the barrel hollow space, and the summation of the land cross-sectional shear areas for all of the lands of the mixing element is greater than or equal to 95% of the flow cross-sectional area between the adjacent flights of the screw through which polymer passes immediately prior to entering the mixing element.

15 Claims, 3 Drawing Sheets

U.S. PATENT DOCUMENTS

| | | | |
|---|---|---|---|
| 4,409,164 A | * 10/1983 | Brasz et al. | .................. 264/50 |
| 4,425,044 A | * 1/1984 | Kurtz et al. | .................. 366/79 |
| 4,461,734 A | * 7/1984 | Jones et al. | ................. 425/207 |
| 4,842,414 A | * 6/1989 | Dray | .......................... 366/82 |
| 5,098,267 A | * 3/1992 | Cheng | ......................... 366/81 |
| 5,156,790 A | * 10/1992 | Cucchisi et al. | .............. 366/81 |
| 5,439,633 A | * 8/1995 | Durina et al. | ............... 425/208 |
| 5,449,484 A | 9/1995 | Gusik | |
| 5,932,159 A | * 8/1999 | Rauwendaal | ................ 366/322 |
| 6,132,076 A | * 10/2000 | Jana et al. | .................... 366/81 |
| 6,136,246 A | 10/2000 | Rauwendall et al. | |
| 6,454,454 B1 | * 9/2002 | Barr | ............................. 366/78 |
| 2003/0128623 A1 | * 7/2003 | Leveque | ...................... 366/81 |

\* cited by examiner

MIXING APPARATUS

CROSS-REFERENCE TO RELATED APPLICATION

This application claims the benefit of U.S. Provisional Application No. 60/331,817, filed Nov. 20, 2001.

BACKGROUND OF THE INVENTION

1. Field of the Invention

This invention relates to an apparatus for mixing thermoplastic materials, and more particularly to screws for mixing multiple polymers, which screws can be used in extruders and injection molding machines.

2. Description of the Related Art

Figure 1:
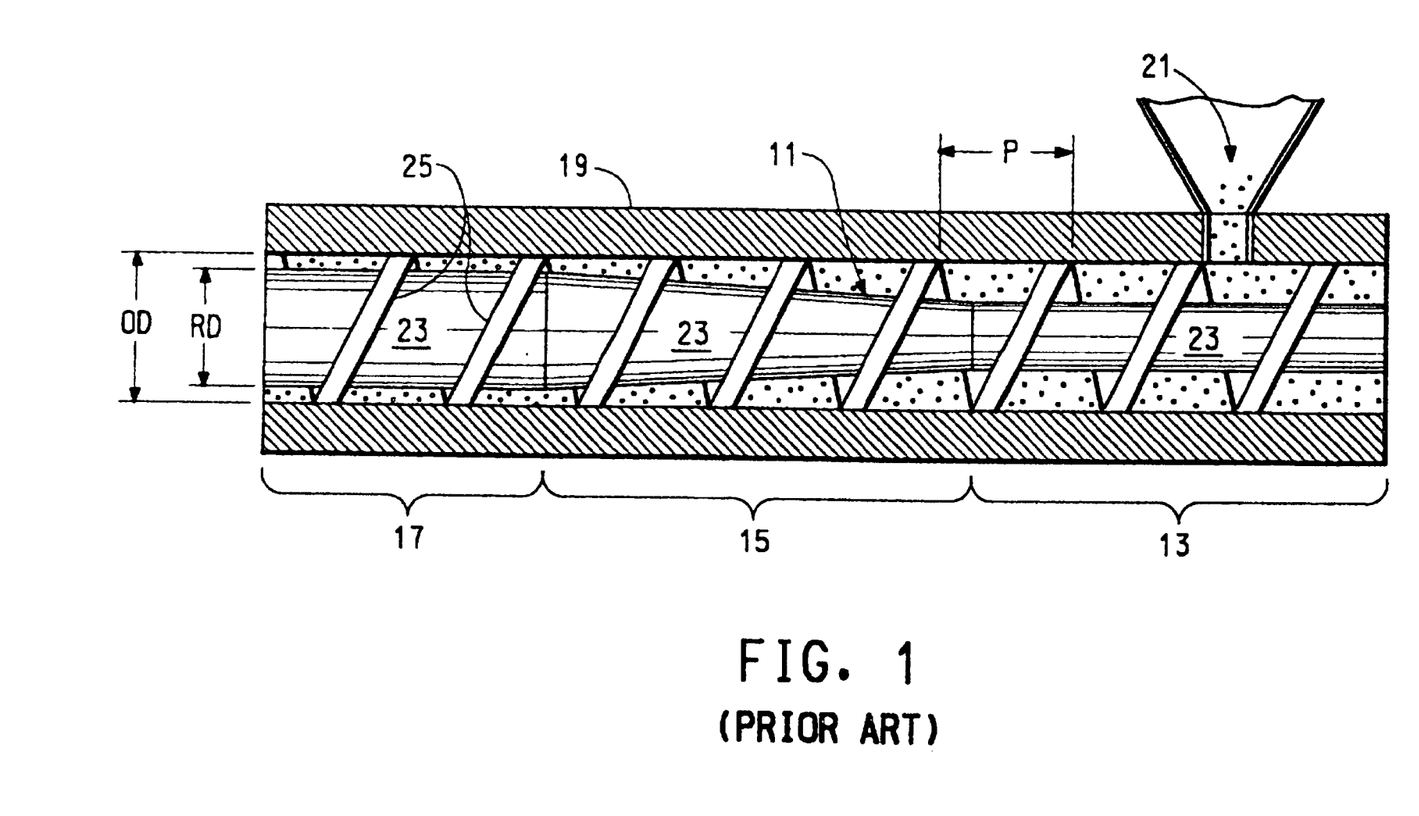
FIG. 1 is a side view of a conventional screw.

The use of screws to extrude, compound, and injection mold polymer is well known. Turning to FIG. 1, there is shown a conventional screw 11 for use in melting and mixing polymers. The screw includes three zones: a feeding zone 13, a compression or transition zone 15 and a metering zone 17. Screw 11 is housed in a hollow barrel 19 having a constant inner cylindrical diameter and a smooth inner surface. Polymer resin, which may be in any form such as pellets, granules, flakes or powder, is fed through an opening 21 in barrel 19 into feeding zone 13 where screw 11 turns to pack and then push the polymer into compression zone 15. The polymer is melted in compression zone 15 and then conveyed to metering zone 17 where the molten material is homogenized. Afterwards, the homogenized melt is extruded, injection molded or processed further.

Screw 11 includes a screw shaft 23 having a thread spirally positioned about shaft 23 to form flights 25. Flights 25 are characterized by their depth, which is the height of flight 25 above shaft 23 and by their pitch, which is the distance P between two adjacent flights 25 plus one flight width. The outside diameter OD of screw 11 includes the depth of a flight 25 above and below shaft 23, whereas the root diameter RD of screw 11 is the diameter of shaft 23 only, without including the depth of flights 25.

Figure 2:
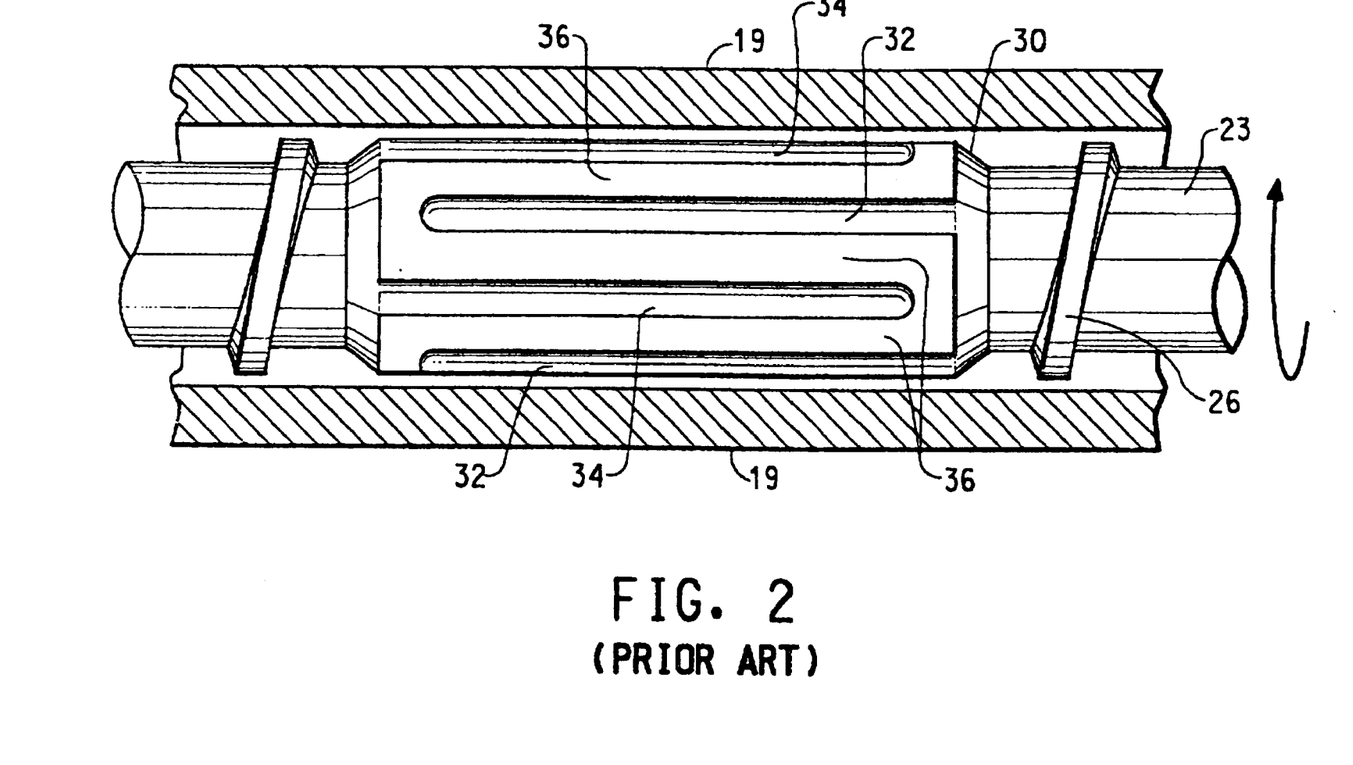
FIG. 2 is a side view of a portion of a conventional mixing element on a screw.

U.S. Pat. No. 3,486,192 discloses a mixing element for incorporation into an extrusion screw, which mixing element is shown in FIG. 2. The mixing element 30 is an elongated cylinder with a surface that is machined with surface grooves 32 and 34 which are separated by raised lands 36. The input grooves 32 are open at the end of the mixing element facing the end of the element 30 from which polymer is fed by the screw to the mixing element and the input grooves 32 are closed at the opposite end of the mixing element. The output grooves 34 are open at the end of the mixing element facing the end of the element 30 toward which polymer is discharged and the output grooves 34 are closed at the opposite end of the mixing element. The lands 36 form a barrier between the input grooves 32 and the output grooves 34, but there is a clearance between the top of the lands and the inside surface of the barrel 19. The mixing element 30 rotates with and is driven by the turning of the screw shaft 23. The rotation of the screw forces molten polymer into the input grooves 32 of the mixing element 30, over the top of the lands 36 through the clearance between the lands 36 and the inside surface of the barrel 19 and out through the output grooves 34. The polymer melt is subjected to a high sheer stress as it is squeezed between the top of the lands 36 and the inside surface of the barrel 19. Additional screw mixing element configurations are disclosed in U.S. Pat. No. 6,136,246.

With mixing elements like that described above, it has been difficult to obtain a very high degree of polymer mixing without at the same time generating excessive heating of the polymer which frequently causes degradation of the polymer. Accordingly, there is a need for a mixing screw for use in extruders and injection molding machines that achieves a very high degree of mixing and homogenization but that does not generate undue heating or degradation of the polymer. There is also a need for a screw with a mixing element that generates a high degree of polymer mixing but does not constrain flow of the polymer through the screw so as to make reductions in screw rotation speeds and overall polymer resin throughput rates necessary. What is needed, therefore, is an apparatus that will produce a homogeneous melt from multiple polymers without causing substantial degradation of the polymer resins.

SUMMARY OF THE INVENTION

The present invention relates to an apparatus for mixing thermoplastic materials, and more particularly to screws for mixing multiple polymers which screws can be used in extruders and injection molding machines. The apparatus includes a barrel having a hollow space therein with a substantially round cross section and a longitudinal axis, with the barrel hollow space having an inside surface and a screw rotatably mounted in the barrel hollow space. The screw is mounted coaxially with the longitudinal axis of the barrel hollow space so as to transmit a polymer material through the barrel hollow space from an inlet end of the barrel hollow space to an outlet end of the barrel hollow space when the screw is rotated. The screw has a screw shaft with a thread spirally extending around the screw shaft so as to form a plurality of flights, and the screw has a zone through which melted polymer is conveyed. The screw has a flow cross-sectional area between adjacent flights of the screw that is equal to the radial height that the screw thread of the adjacent flights extends above the screw shaft multiplied by the width between adjacent flights. The screw has a portion within the zone through which melted polymer is conveyed which screw portion is without a screw thread and where the screw shaft forms a mixing element having an inlet end directed toward the inlet end of the barrel hollow space and an outlet end directed toward the outlet end of the barrel hollow space.

The mixing element of the screw comprises a drum-shaped surface extending above the screw shaft that is coaxial with the screw shaft. This drum-shaped surface has a plurality of input grooves on the drum-shaped surface extending in a generally axial direction with groove openings at the inlet end of the mixing element, wherein the input grooves terminate before reaching the outlet end of the mixing element, and a plurality of output grooves on the drum-shaped surface extending in a generally axial direction with groove openings at the outlet end of the mixing element, wherein the output grooves terminate before reaching the inlet end of the mixing element. The plurality of output grooves alternate with the plurality of input grooves such that the input and output grooves are contiguous with each other over a portion of the surface of the mixing element. Lands extending between the input grooves and output grooves separate the input grooves from the output grooves, with the length of each land being substantially equal to the length of the contiguous portion of the adjacent input and output grooves. Each of the lands has a top surface extending the length of the land that has a thickness between the input and output grooves of less than 2 mm. The top surface of the lands extends toward but does not touch the inside surface of the hollow barrel. The clearance between the top surface of said lands and the inside surface of the barrel hollow space is preferably less than 0.5 mm.

According to the invention, there is a land cross-sectional shear area corresponding to each land that is equal to length of the land multiplied by the clearance between the land and the inside surface of the barrel hollow space, and the summation of the land cross-sectional shear areas for all of the lands of the mixing element is greater than or equal to 95% of the flow cross-sectional area between the adjacent flights of the screw through which polymer passes immediately prior to entering the mixing element.

DETAILED DESCRIPTION

The present invention relates to a mixing apparatus that can be used in an injection molding machine or an extruder. The mixing apparatus includes a screw with a screw shaft having a thread spirally positioned about the screw shaft so as to form a plurality of flights. The screw has three zones: a feeding zone, a compression zone and a metering zone, and in use is mounted in a hollow cylindrical barrel having a preferably smooth inner cylindrical wall which allows the screw to rotate within the hollow barrel. A mixing element is incorporated into the metering zone of the screw to enhance polymer mixing without inducing excessive compression or shear in a polymer being mixed.

As used herein, the term "feeding zone" refers to that zone of the screw where the material is introduced and has not been fully melted. Where the polymer is introduced in the form of polymer pellets, the pellets are present in the feeding zone in their unmelted bulk form.

The term "compression zone" refers to that zone of the screw where the material is being compressed and melted. In the case of polymer pellets, for example, the pellets are present in the compression zone in a mixed state between their bulk form and molten form. The walls of the hollow barrel within which the screw rotates are heated in the compression zone to melt the polymer being mixed by the screw.

The term "metering zone" refers to that zone of a screw where the material has been fully melted and the molten polymer is homogenized. In the case of resin pellets, the pellets are present in a completely molten form. The walls of the hollow barrel may be heated in the metering zone to help maintain the temperature of the polymer melt.

A flight of the screw is characterized by its depth, which is defined as the height of the flight above the screw shaft, by its width, and by its pitch, which is defined as flight length (the distance between two adjacent turns of the flight on the screw shaft) plus one flight width. If a flight has a pitch of 25 mm, it means that when the screw is rotated once, the polymer in the flight is moved axially 25 mm in the screw.

The "flow cross-sectional area" between adjacent flights of a screw is equal to the depth of the annular space between the screw shaft 23 and the inside surface of the hollow barrel 19 multiplied by the width of the pitch. The width (W) of the pitch can be calculated by the following formula:

$$W = P(\cos \theta) - e$$

where "$\theta$" is the angle of the flight versus the direction perpendicular to the longitudinal axes of the screw, "P" is the pitch, and "e" is the thickness of the flight.

In the mixing apparatus of the present invention, the screw includes at least one mixing element in the zone of a screw through which melted polymer is conveyed. The mixing element does not restrict the passage of polymer but, at the same time, induces a very high degree of polymer mixing. In a preferred embodiment of the invention the mixing element is located in the metering zone of the screw. The mixing element is preferably located at or near where the compression zone meets the metering zone of the screw. Alternatively, the mixing element, may be located elsewhere in the metering zone, including in the most downstream third of the metering zone. In an alternative embodiment of the invention, the screw might be one with a feeding zone and a compression zone but no metering zone, with a mixing element located at the end of the compression zone where the polymer has been melted. In another alternative embodiment of the invention, the screw can be made with a feeding zone followed by a compression zone that is in turn followed by a very short metering zone of no more than one flight, with the mixing element located at the end of this very short metering zone.

Figure 3:
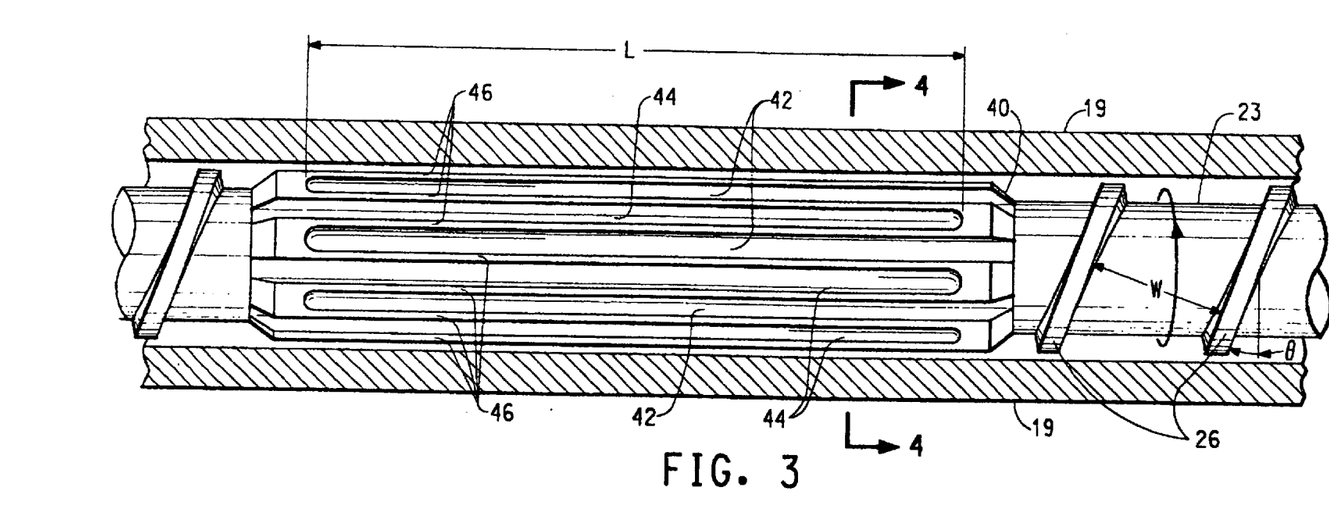
FIG. 3 is a side view of a mixing element on a screw according to the invention.
Figure 4:
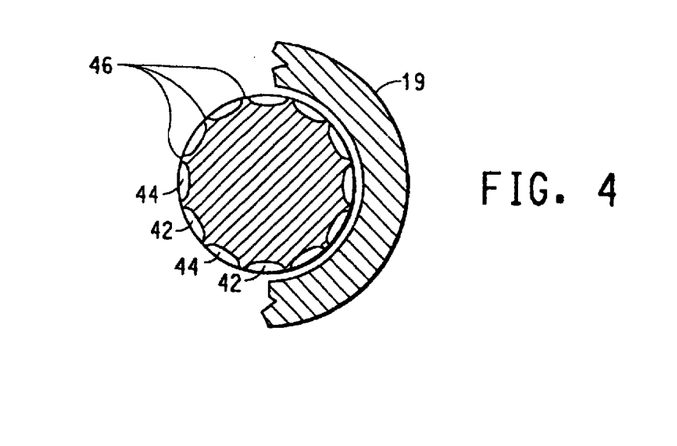
FIG. 4 is a cross-sectional view of the mixing element shown in FIG. 3.

A preferred embodiment of the mixing element of the mixing apparatus of the present invention is shown in FIGS. 3 and 4. The mixing element 40 is an elongated cylinder with surface machined or molded with surface grooves 42 and 44 that are separated by raised lands 46. The surface grooves 42 and 44 preferably have a curved cross section, such as a rounded cross section or the parabolic groove cross sections shown in FIG. 4. The input grooves 42 are open at the end of the mixing element facing the end of the element 40 from which polymer is fed by the screw to the mixing element and the input grooves 42 are closed at the opposite end of the mixing element. The output grooves 44 are open at the end of the mixing element facing the end of the element 40 toward which polymer is discharged and the output grooves 44 are closed at the opposite end of the mixing element. The lands 46 form a barrier between the input grooves 42 and the output grooves 44, but there is a clearance between the top of the lands and the inside surface of the barrel 19. The cylinder of the mixing element rotates with and is driven by the turning of the screw shaft 23. The rotation of the screw forces molten polymer into the input grooves 42 of the mixing element 40, over the top of the lands 46 through the clearance between the tops of the lands 46 and the inside of the barrel 19 and out through the output grooves 44.

According to an alternative embodiment of the invention, the grooves and lands on the surface of the mixing element may be arranged at an angle to the rotational axis of the mixing element and the screw. For example, the input grooves, output grooves and the lands separating the input grooves from the output grooves can helically wrap around the surface of the mixing element. According to another alternative embodiment of the invention, the width of the input grooves 42 can be made wider toward their open ends and narrower toward their closed ends, and the output grooves 44 can be made complementary such that they are also wider toward their open ends and narrower toward their closed ends, while the lands 46 maintain a substantially uniform width along their length.

In the mixing apparatus of the invention, the clearance between the tops of the lands 46 and the interior surface of the hollow barrel 19 is less than 0.5 mm, and more preferably is less than 0.3 mm, but greater than 0.05 mm. This low degree of clearance generates a high degree of shear in the polymer as it passes over the lands 46. This high shear quickly heats and mixes all portions of the polymer as the polymer is squeezed between the lands 46 and the interior of the hollow barrel. In order to prevent overheating, and possible polymer degradation, the thickness of the lands 46 is maintained at less than 2 mm, and more preferably less than 1.4 mm, and even more preferably less than 1 mm. This narrow clearance and very thin land width makes it possible to induce a very high degree of shear in the polymer for a very short period of time. The short duration of the high shear state prevents the polymer from overheating which could otherwise cause degradation of the polymers being mixed.

Preferably, the input grooves 42 and the output grooves 44 are more than three times as deep as the clearance between the lands 46 and the barrel 19. It is further preferred that the input grooves 42 and the output grooves 44 be at least four times wider than the thickness of the lands 46. The input grooves 42 and the output grooves 44 generally have a depth of from 1 to 6 mm and a width of from 4 to 15 mm, depending on the size of the screw. For example, in the screw disclosed in Example 1, input grooves 42 and output grooves 44 each had a depth of 2.8 mm and a width of 11 mm, while the top of each land facing the barrel 19 had a thickness of 0.7 mm and the clearance between the top of the lands 46 and the inside surface of the barrel was 0.25 mm.

The "shear area" of a mixing element is defined as the clearance between the lands 46 and inside of the hollow barrel 19 multiplied by the land length ("L" in FIG. 3) multiplied by two times the number of input grooves. According to the preferred embodiment of the invention, the shear area of each mixing element incorporated into the screw is greater than or equal to 95% of the flow cross-sectional area between the adjacent flights of the screw through which polymer passes immediately prior to entering the mixing element. More preferably, the shear area of each mixing element is greater than or equal to the flow cross-sectional area between the adjacent flights of the screw through which polymer passes immediately prior to entering the mixing element. According to the most preferred embodiment of the invention, the shear area of each mixer is from 100% to 120% of the flow cross-sectional area between the adjacent flights of the screw through which polymer passes immediately prior to entering the mixing element. By providing a mixing element with a shear area that is substantially equal to or greater than the flow cross-sectional area, the mixing element does not constrain the polymer throughput rate of the screw.

It has been found that the mixing apparatus of the invention is effective when the screw is one with a low volumetric compression ratio. Compression ratio is an expression of the amount that the screw compresses or squeezes a polymer resin during processing. The volumetric compression ratio is the volume of a flight of the screw in the feed section divided by the volume of a flight in the metering section of the screw. In practice, for screws having a constant pitch, the compression ratio can be calculated by the following simplified equation:

$$\text{Compression ratio} = \frac{\text{(depth of flight in feeding zone)}}{\text{(depth of flight in metering zone)}}$$

High compression screws generally used for crystalline or semi-crystalline polymer materials have a compression ratio of greater than about 2.5. Standard compression screws, which are generally used in processing amorphous materials have compression ratios of from about 1.8 to 2.5. Screws with a compression ratio of less than 1.8 are considered to have a low compression ratio.

A low volumetric compression screw can be designed according to the principals of PCT Patent Publication No. WO 99/56937 and customized for the polymer resin being injected molded. In such screws, the mass flow of polymer resin is balanced along the length of the screw such that there is a constant pressure gain along the screw without pressure peaks.

The mixing apparatus of the invention can be used to mix a wide range of polymers and polymer additives. The inventive screw may be used in an extruding machine or in an injection molding machine such as an injection blow molding machine. The screw has been found to be especially useful for extruding and injection molding blends of multiple polymers. While the invention has been illustrated with a screw having one screw and one mixing element, the scope of the present invention includes a screw having two or more of the mixing elements as described above, or an apparatus having two or more such screws. While the invention has been illustrated in the context of a screw having one flight, the scope of the present invention includes a screw having more than one flight.

The invention is further illustrated by the following examples. The examples are for illustrative purposes only and are not intended to limit the invention. Modification of detail may be made without departing from the scope of the invention.

EXAMPLES

Example 1 and Comparative Example 2

In Example 1, a screw according to the invention was made and was used to injection mold a polyacetal thermoplastic resin. The polyacetal resin was introduced into the feeding zone in the form of granular pellets having a diameter of from about 2 to 4 mm. The polyacetal resin was Delrin® 500 P, a polyacetal resin compounded with about 1% by weight added thermal stabilizers and lubricating agents, having a melting point of 177° C. (ISO 3146 method C2) and a melt flow rate of 15 g/10 min by standard techniques (ISO 1133) at a temperature of 190° C. with a 2.16 Kg weight, and which is available from E. I. du Pont de Nemours and Company (DuPont) of Wilmington, Del., U.S.A.

The screw of Example 1 had a feeding zone, a compression zone, and a metering zone, and it had a low volumetric compression ratio as disclosed in PCT Publication WO 99/56937. The screw incorporated one mixing element as described above with regard to FIGS. 3 and 4. The mixing element was located at the beginning of the metering zone where the compression zone meets the metering zone. The screw was made entirely of nitriding steel with a hardness of 83 HRA and the dimensions set forth below.

In Comparative Example 2, a screw was made like the screw of Example 1, except that it did not include a mixing element, and this screw was used to injection mold the same polyacetal thermoplastic resin as was used in Example 1.

The screws used in Example 1 and Comparative Example 2 had the following dimensions:

|  | Example 1 | Comparative Example 2 |
|---|---|---|
| Screw diameter | 30 mm | 30 mm |
| Compression ratio (volume) | 1.55 | 1.55 |
| Metering Zone |  |  |
| Flight Pitch | 42 mm | 42 mm |
| Flight Depth | 2.6 mm | 2.6 mm |
| Flow cross-sectional Area | 92.0 mm$^2$ | 92.0 mm$^2$ |
| Mixing Element |  |  |
| Number of Lands | 8 | — |
| Land length (L) | 50 mm | — |
| Land width (at top) | 0.7 Mm | — |
| Clearance (land tops-barrel) | 0.25 mm | — |
| Total Shear Area | 100 mm$^2$ | — |
| Shear Area/Metering Area (%) | 104% | — |

In both Example 1 and Comparative Example 2, the screw was used in an injection molding machine having a 150 ton clamping force and equipped with a 30 mm diameter barrel. The barrel was connected to a two cavity mold tool having a volume of about 40 cm$^3$. A molding cycle time of about 1 minute was used. During each cycle, the screw was turned for about 4 seconds at a rate of 190 rpm to move molten polymer into an accumulator portion of the barrel located between the end of the screw and the mold cavity. The screw was then advanced over a 6.7 cm stroke so as to inject the accumulated polymer into the mold cavity. The polymer was allowed to crystallize in the mold cavity for about 55 seconds before the molded article was removed from the mold cavity and the cycle was repeated. The total screw output was 55 kg/hr. The barrel temperature was set at 200° C. in the feeding zone, 210° C. in the compression zone, and 215° C. in the metering zone and accumulator section. The temperature of the mold was set at 90° C. In Example 1, the temperature of the polymer coming out of the screw was less than 2° C. greater than the barrel temperature, which demonstrates that the mixing process caused little additional heating of the polymer melt even though a mixing element was used in Example 1.

Dog-bone-shaped tensile test bars were injection molded in the two cavity mold tool at a rate of about one molding operation per minute. The tensile bars were prepared according to ISO 294, and had total length of 16.6 cm with a restricted portion that was 8 cm long, 1 cm wide and 4 mm thick. During each molding operation, the turning screw first dosed the polymer melt before stopping and thrusting 6.7 cm in an axially direction in order to force the polymer in the mold cavity.

Ten tensile bars molded with each screw were randomly selected for tensile testing according to ISO 527-1. The mechanical properties of the tested bars were as follows:

|  | Example 1 | Comparative Example 2 |
|---|---|---|
| Tensile Strength - average | 72 Mpa | 69 MPa |
| Modulus - average | 3.1 Gpa | 3.3 GPa |
| Elongation at Break - minimum | 40% | 22% |
| Elongation at Break - maximum | 71% | 62% |
| Elongation at Break - average | 58.0% | 48.7% |

The consistency of the result for the elongation at break is good indicator of the homogeneity of the polymer melt that was used to make the bar. It can be seen that the minimum elongation was 18% greater for the bars made with the screw of the invention than for the bars made with the screw of Comparative Example 2. It can be seen that the increased consistency obtained with the screw of the invention was not achieved at a cost of degradation of the polymer which would have reduced the tensile strength of the test bars.

Examples 3, 4, and Comparative Example 5

In Example 3 and 4, a screw with a mixing element, as described above in Example 1, was used in the injection molding machine of Example 1 to injection mold polyacetal thermoplastic resin compositions of the same formulation, but that were introduced into the feeding section of the screw in different forms. In Example 3, the components of the composition were pre-compounded in a separate compounding operation prior to injection molding. In Example 4, the components of the composition were introduced directly to the injection molding screw without a prior pre-compounding operation. In Comparative Example 5, the injection molding machine used in Examples 3 and 4 was used to injection mold the multiple component resin of Example 4, but the screw used was the screw of Comparative Example 2, which did not include a mixing element.

In Example 4 and Comparative Example 5, the polyacetal resin was a polyoxymethylene homopolymer in the form of microbeads with an average diameter of 0.25 mm and a gaussian distribution of particle sizes ranging from 0.06 mm to 0.50 mm. Thermal stabilizer and lubricating agents in fine powder form were mixed with the polyacetal microbeads in a hopper with a rotating mixing blade to form an overall mixture comprised of about 1% added thermal stabilizers and lubricating agents.

In Example 3, the thermoplastic resin used was Delrin® 500 P polyacetal resin, a polyoxymethylene homopolymer pre-compounded with about 1% by weight added thermal stabilizers and lubricating agents, and which is available from E. I. du Pont de Nemours and Company (DuPont) of Wilmington, Del., U.S.A. This pre-compounded resin was in the form of granular pellets having a diameter of from about 2 to 4 mm, and it had a melting point of 177° C. (ISO 3146 method C2) and a melt flow rate of 15 g/10 min by standard techniques (ISO 1133) at a temperature of 190° C. with a 2.16 Kg weight. The pre-compounding of the stabalizers and lubricating agents was done in a conventional manner using a single screw polymer extruder. The polyoxymethylene homopolymer, thermal stabilizers and lubricating agents present in the composition of Example 3 were the same as those used in Example 4 and Comparative Example 5, and these components were present in the same proportions in the pre-compounded composition of Example 3 as was used in Example 4 and Comparative Example 5.

In Examples 3, 4, and Comparative Example 5 the resins were injection molded with an injection molding machine having a 150 ton clamping force and equipped with a 30 mm diameter barrel. The barrel was connected to a two cavity mold tool having a volume of 40 cm$^3$. A molding cycle time of about 1 minute was used. During each cycle, the screw was turned for about 4 seconds at a rate of 190 rpm to move molten polymer into an accumulator portion of the barrel located between the end of the screw and the mold cavity. The screw was then advanced over a 6.7 cm stroke so as to inject the accumulated polymer into the mold cavity. The polymer was allowed to crystallize in the mold cavity for about 55 seconds before the molded article was removed from the mold cavity and the cycle was repeated. The total screw output in Examples 3, 4, and Comparative Example 5 was 55 kg/hr.

In Examples 3, 4 and Comparative Example 5, the barrel temperature was set at 200° C. in the feeding zone, 210° C. in the compression zone, and 215° C. in the metering zone and accumulator section. The temperature of the mold was set at 90° C. In each example, the temperature of the polymer coming out of the screw was less than 4° C. greater than the barrel temperature, which demonstrates that the mixing process caused little additional heating of the polymer melt even when the mixing element was used in Examples 3 and 4.

Dog-bone-shaped tensile test bars were injected molded in the two cavity mold tool at a rate of about one molding operation per minute. The tensile bars were prepared according to ISO 294, and had total length of 16.6 cm with a restricted portion that was 8 cm long, 1 cm wide and 4 mm thick.

Ten tensile bars molded with each screw were randomly selected for tensile testing according to ISO 527-1. The mechanical properties of the tested bars were as follows:

|  | Example 3 | Example 4 | Comp. Ex. 5 |
| --- | --- | --- | --- |
| Tensile Strength - average | 72 Mpa | 72 MPa | 69.9 MPa |
| Modulus - average | 3.3 Gpa | 3.3 GPa | 3.1 GPa |
| Elongation at Break - minimum | 44% | 40% | 18% |
| Elongation at Break - maximum | 65% | 71% | 53.5% |
| Elongation at Break - average | 51.0% | 58.7% | 43.3% |

The consistency of the result for the elongation at break is good indicator of the homogeneity of the polymer melt that was used to make the bar. It can be seen that with the screw of the present invention, the minimum elongation for the pre-compounded composition (Example 3) was not reduced significantly when the compounding step was eliminated and the same components were fed directly to the injection molding screw (Example 4). However, when a screw without a mixing element according to the invention was used in Comparative Example 5 and the same components were fed directly to the injection molding screw, the minimum elongation at break decreased by more than 20%. It can be seen that the increased consistency is obtained with the screw of the invention even when the components of a resin formulation are not compounded in advance.

An advantage of injection molding directly from individual components is that a separate extrusion compounding operation is not needed to combine all of the components of the formulation of the resin. The compounding is done in the injection molding unit. This process produces molded articles with mechanical properties equivalent to what can be produced using pre-compounded resins. Prior to this invention, the mechanical properties were lower, especially the average elongation to break due to unmelted or unmixed particles that were injected into the tensile bars. Surprisingly, it can be seen that the elongation to break for the molded article made directly from a rough mix of polyacetal, thermal stabilizers and lubricating agents is substantially the same as that of molded articles made from pre-compounded pellets of the same composition.

We claim:

1. An apparatus for extruding a polymer melt comprising:
   a barrel having a hollow space therein with substantially round cross section and a longitudinal axis, said barrel hollow space having an inside surface,
   a screw rotatably mounted in the barrel hollow space, said screw being mounted coaxially with the longitudinal axis of the barrel hollow space, said screw mounted for transmitting a polymer material through the barrel hollow space from an inlet end of the barrel hollow space to an outlet end of the barrel hollow space when the screw is rotated, said screw having a screw shaft with a thread spirally extending around the screw shaft so as to form a plurality of flights, said screw having a zone through which melted polymer is conveyed,
   the screw having a flow cross-sectional area between adjacent flights of the screw that is equal to the radial height that the screw thread of the adjacent flights extends above the screw shaft multiplied by the width between adjacent flights,
   said screw having a portion within the zone through which melted polymer is conveyed which screw portion is without a screw thread and where the screw shaft forms a mixing element having an inlet end directed toward the inlet end of the barrel hollow space and an outlet end directed toward the outlet end of the barrel hollow space, said mixing element comprising
   a drum-shaped surface extending above the screw shaft that is coaxial with the screw shaft,
   said drum-shaped surface having a plurality of input grooves on the drum-shaped surface extending in a generally axial direction with groove openings at the inlet end of the mixing element, said input grooves terminating before reaching the outlet end of the mixing element,
   said drum-shaped surface having a plurality of output grooves on the drum-shaped surface extending in a generally axial direction with groove openings at the outlet end of the mixing element, said output grooves terminating before reaching the inlet end of the mixing element, said plurality of output grooves alternating with said plurality of input grooves such that said input and output grooves are contiguous with each other over a portion of the surface of the mixing element,
   lands extending between said input grooves and output grooves that separate said input grooves from said output grooves, the length of each land being substantially equal to the length of the contiguous portion of the adjacent input and output grooves, each of said lands having a top surface extending the length of the land that has a thickness between the input and output grooves of less than 2 mm, each said top surface of said lands extending toward but not touching the inside surface of the hollow barrel, the clearance between each top surface of said lands and the inside surface of the barrel hollow space being less than 0.5 mm,
   wherein there is a land cross-sectional shear area corresponding to each land that is equal to length of the land multiplied by the clearance between the top surface of the land and the inside surface of the barrel hollow space, and the summation of the land cross-sectional shear areas for all of the lands of the mixing element is greater than or equal to 95% of the flow cross-sectional area between the adjacent flights of the screw through which polymer passes immediately prior to entering the mixing element.

2. The apparatus of claim 1 wherein the summation of the land cross-sectional shear areas for all of the lands of the mixing element is greater than or equal to 100% of the flow cross-sectional area between the adjacent flights of the screw through which polymer passes immediately prior to entering the mixing element.

3. The apparatus of claim 1 wherein the summation of the land cross-sectional shear areas for all of the lands of the mixing element is between 100% and 120% of the flow cross-sectional area between the adjacent flights of the screw through which polymer passes immediately prior to entering the mixing element.

4. The apparatus of claim 2 wherein the summation of the land cross-sectional shear areas for all of the lands of the mixing element is greater than or equal to 102% of the flow cross-sectional area between the adjacent flights of the screw through which polymer passes immediately prior to entering the mixing element.

5. The apparatus of claim 1 wherein each top surface of the lands extending the length of the lands have a thickness between the input and output grooves of between 0.2 mm and 1.4 mm, and said land clearance between the top surface of said lands and the inside surface of the barrel hollow space is in the range of 0.1 mm to 0.3 mm.

6. The apparatus of claim 1 wherein the screw zone through which molten polymer is conveyed includes a metering zone proximate the outlet end of the barrel and the mixing element is located within said metering zone.

7. The apparatus of claim 6 wherein the metering zone has opposite ends, and there is a midpoint between the opposite ends of the metering zone and the mixing element is located between said midpoint and the end of the metering zone directed toward the inlet end of the barrel hollow space.

8. The apparatus of claim 7 wherein the mixing element is proximate the end of the metering zone directed toward the inlet end of the barrel hollow space.

9. The apparatus of claim 6 wherein the screw has a feeding zone and a compression zone, and wherein the ratio of the volume of a flight in the feeding zone to the volume of a flight in the metering zone is less than 1.8.

10. The apparatus of claim 6 wherein the metering zone has no more than one flight and wherein the mixing element is located at the outlet end of the metering zone.

11. The apparatus of claim 1 wherein the mixing element includes at least three input grooves and at least three output grooves.

12. The apparatus of claim 11 wherein the mixing element includes at least five input grooves and at least five output grooves.

13. The apparatus of claim 1 wherein the hollow space of the barrel is cylindrically shaped.

14. The apparatus of claim 1 wherein the apparatus is part of a polymer extruder.

15. The apparatus of claim 1 wherein the apparatus is the polymer extruder of an injection molding machine.

* * * * *